US012694217B2

(12) United States Patent
Li et al.

(10) Patent No.: US 12,694,217 B2
(45) Date of Patent: Jul. 28, 2026

(54) ENTITY RECOGNITION METHOD, MODEL TRAINING METHOD, ELECTRONIC DEVICE, AND MEDIUM

(71) Applicant: Beijing Baidu Netcom Science Technology Co., Ltd., Beijing (CN)

(72) Inventors: Yu Li, Beijing (CN); Jiawei Zheng, Beijing (CN); Xinjiang Lu, Beijing (CN); Hongwei Xie, Beijing (CN); Xuejiao Lin, Beijing (CN); Jingbo Zhou, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 151 days.

(21) Appl. No.: 18/642,593

(22) Filed: Apr. 22, 2024

(65) Prior Publication Data

US 2024/0273297 A1 Aug. 15, 2024

(30) Foreign Application Priority Data

Jun. 27, 2023 (CN) .......................... 202310769294.3

(51) Int. Cl.
G06F 40/295 (2020.01)
(52) U.S. Cl.
CPC .................................. G06F 40/295 (2020.01)
(58) Field of Classification Search
CPC .... G06F 40/295; G06F 40/143; G06F 40/279; G06F 40/126; G06N 3/042; G06N 3/0464; G06N 3/08
See application file for complete search history.

(56) References Cited

U.S. PATENT DOCUMENTS

| 2014/0184607 A1* | 7/2014 | Toyoshima | ........... | G06T 11/206 |
| | | | | 345/440 |
| 2021/0241050 A1* | 8/2021 | Gunaratna | ............... | G06N 3/09 |
| 2022/0180975 A1* | 6/2022 | Regev | .................... | G16B 40/30 |
| 2024/0404283 A1* | 12/2024 | Wang | .................. | G06V 10/776 |

FOREIGN PATENT DOCUMENTS

CN 112287273 A * 1/2021 ............. G06N 3/045

* cited by examiner

*Primary Examiner* — Pierre Louis Desir
*Assistant Examiner* — Keisha Y. Castillo-Torres
(74) *Attorney, Agent, or Firm* — HSML P.C.

(57) ABSTRACT

An entity recognition method, a model training method, an electronic device, and a medium, which relate to fields of artificial intelligence, information acquiring technologies. The entity recognition method includes: extracting specified entities from a text in a source file of a webpage to be recognized, and acquiring a text encoding result for each specified entity; determining a text block formed by each specified entity in the webpage, and encoding a relative layout information between each two text blocks, to obtain a position encoding result; constructing a triple by the position encoding result for each two text blocks and the text encoding results for respective specified entities of the two text blocks; and performing a graph convolution on each triple to obtain a relation recognition result for the webpage to be recognized, where the relation recognition result indicates whether an association exists between each two text blocks in the webpage.

15 Claims, 10 Drawing Sheets

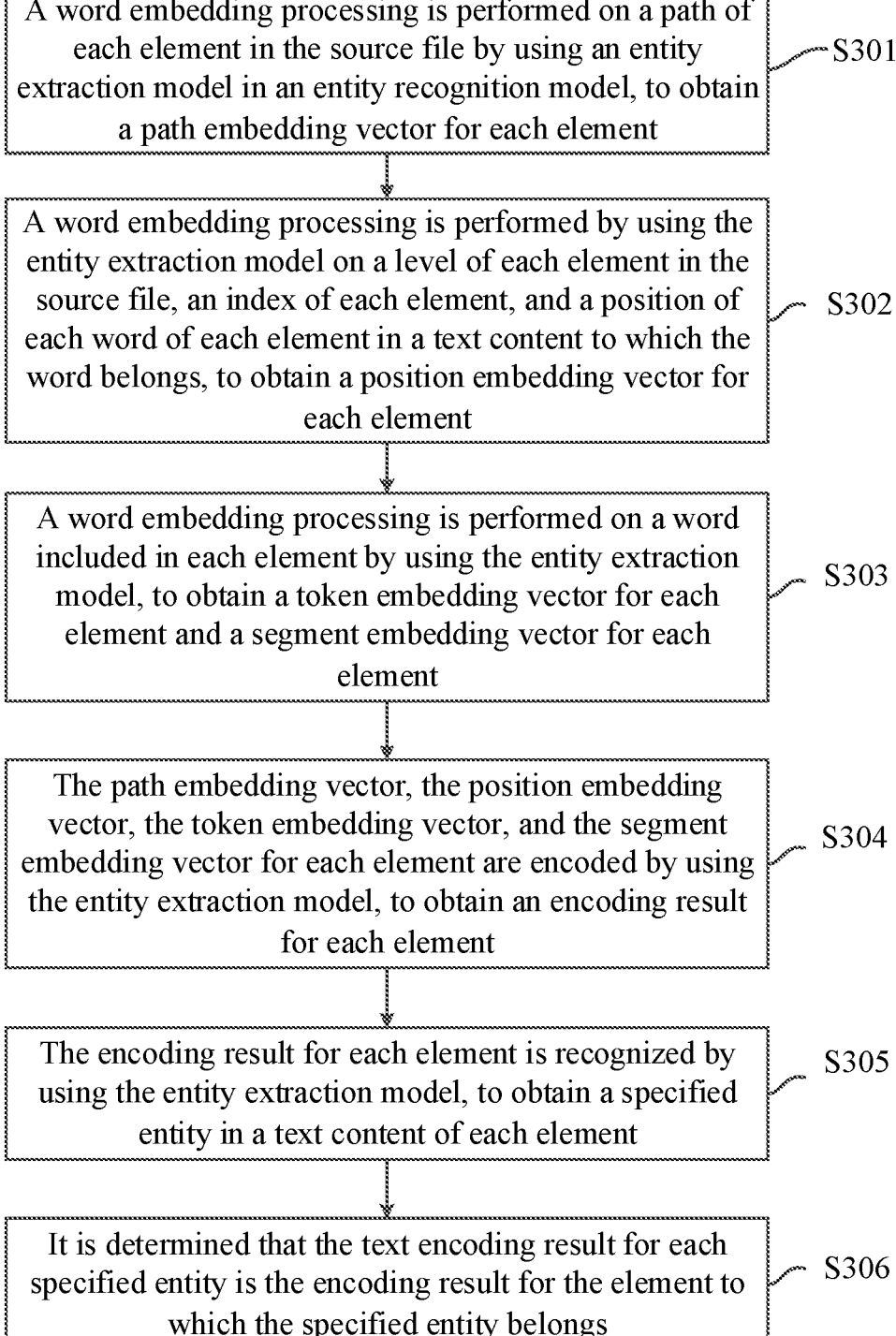

A word embedding processing is performed on a path of each element in the source file by using an entity extraction model in an entity recognition model, to obtain a path embedding vector for each element ⟋⁓ S301

A word embedding processing is performed by using the entity extraction model on a level of each element in the source file, an index of each element, and a position of each word of each element in a text content to which the word belongs, to obtain a position embedding vector for each element ⟋⁓ S302

A word embedding processing is performed on a word included in each element by using the entity extraction model, to obtain a token embedding vector for each element and a segment embedding vector for each element ⟋⁓ S303

The path embedding vector, the position embedding vector, the token embedding vector, and the segment embedding vector for each element are encoded by using the entity extraction model, to obtain an encoding result for each element ⟋⁓ S304

The encoding result for each element is recognized by using the entity extraction model, to obtain a specified entity in a text content of each element ⟋⁓ S305

It is determined that the text encoding result for each specified entity is the encoding result for the element to which the specified entity belongs ⟋⁓ S306

FIG. 3

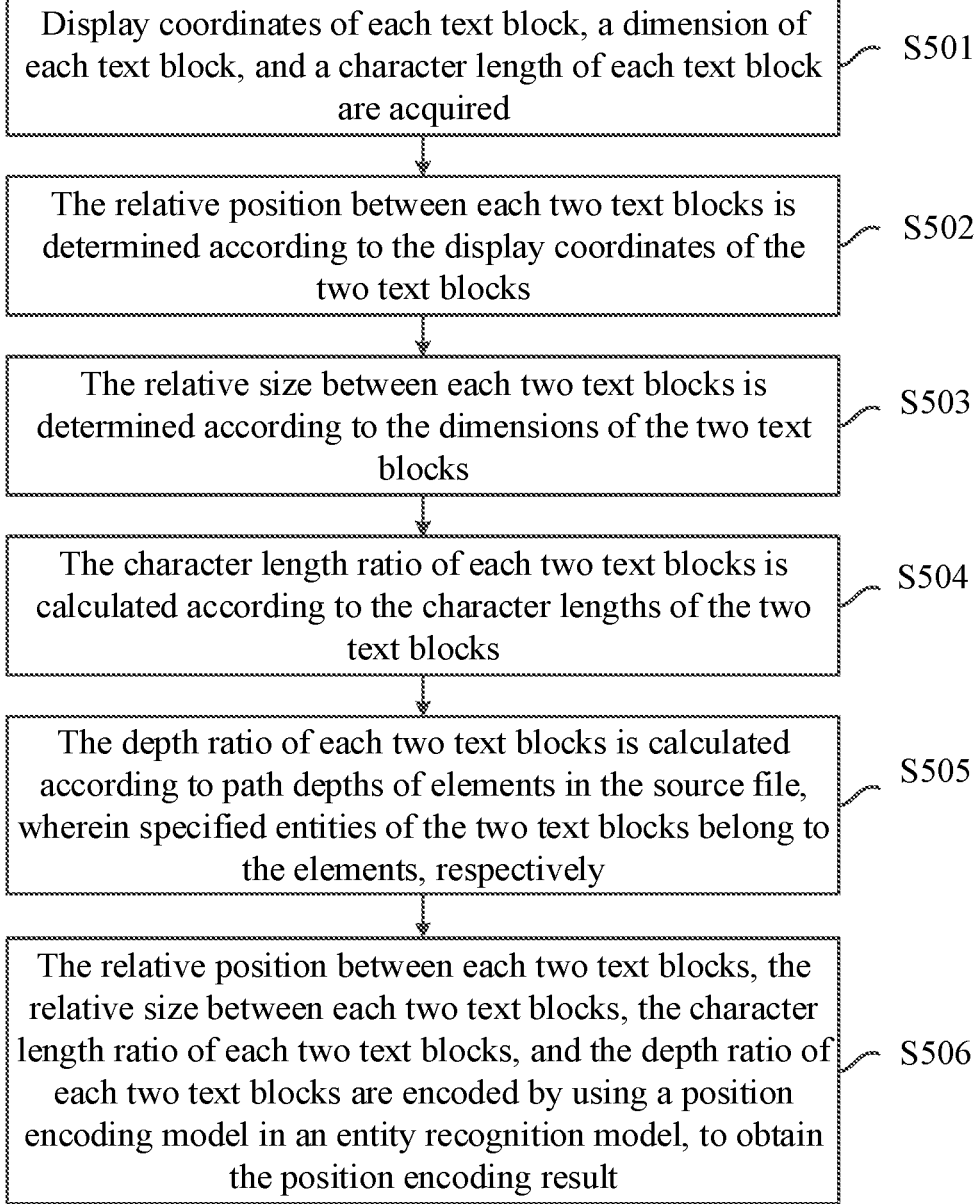

Display coordinates of each text block, a dimension of each text block, and a character length of each text block are acquired — S501

The relative position between each two text blocks is determined according to the display coordinates of the two text blocks — S502

The relative size between each two text blocks is determined according to the dimensions of the two text blocks — S503

The character length ratio of each two text blocks is calculated according to the character lengths of the two text blocks — S504

The depth ratio of each two text blocks is calculated according to path depths of elements in the source file, wherein specified entities of the two text blocks belong to the elements, respectively — S505

The relative position between each two text blocks, the relative size between each two text blocks, the character length ratio of each two text blocks, and the depth ratio of each two text blocks are encoded by using a position encoding model in an entity recognition model, to obtain the position encoding result — S506

FIG. 5

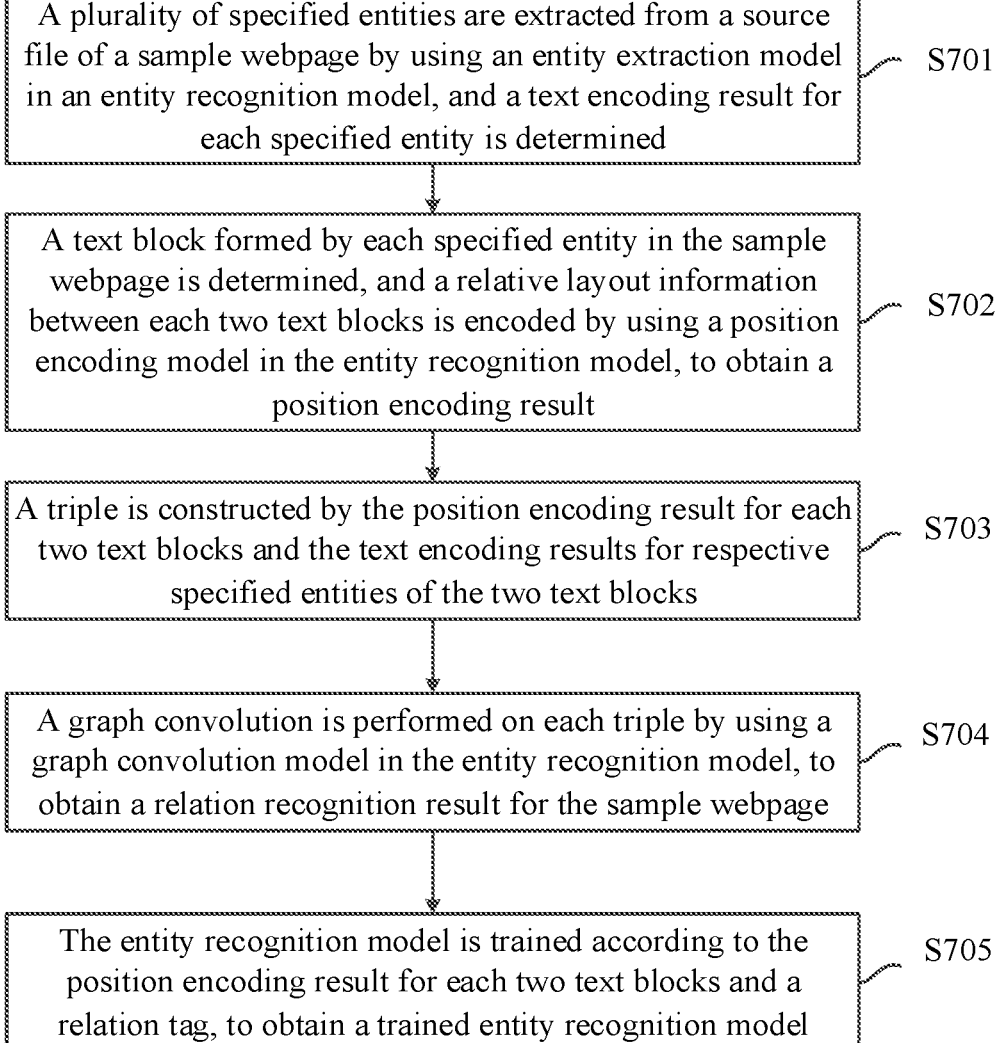

A plurality of specified entities are extracted from a source file of a sample webpage by using an entity extraction model in an entity recognition model, and a text encoding result for each specified entity is determined — S701

A text block formed by each specified entity in the sample webpage is determined, and a relative layout information between each two text blocks is encoded by using a position encoding model in the entity recognition model, to obtain a position encoding result — S702

A triple is constructed by the position encoding result for each two text blocks and the text encoding results for respective specified entities of the two text blocks — S703

A graph convolution is performed on each triple by using a graph convolution model in the entity recognition model, to obtain a relation recognition result for the sample webpage — S704

The entity recognition model is trained according to the position encoding result for each two text blocks and a relation tag, to obtain a trained entity recognition model — S705

ENTITY RECOGNITION METHOD, MODEL TRAINING METHOD, ELECTRONIC DEVICE, AND MEDIUM

This application claims priority to Chinese Patent Application No. 202310769294.3, filed on Jun. 27, 2023, the entire content of which is incorporated herein in its entirety by reference.

TECHNICAL FIELD

The present disclosure relates to a field of artificial intelligence technology, and in particular to a field of information acquiring technology. More specifically, the present disclosure relates to an entity recognition method, a model training method, an electronic device, and a medium.

BACKGROUND

With a rapid development of information technology, the amount of data contained in the Internet is increasing. Due to a rich variety and large amount of data in the Internet, the data in the Internet may be applied to various data analysis scenarios such as natural language processing, personalized content recommendation, and public opinion analysis. Targeted extraction of desired data from webpages is a foundation of various data analysis scenarios.

SUMMARY

The present disclosure provides an entity recognition method, a model training method, an electronic device, and a medium.

According to an aspect of the present disclosure, an entity recognition method is provided, including:

extracting a plurality of specified entities from a text included in a source file of a webpage to be recognized, and acquiring a text encoding result for each specified entity;

determining a text block formed by each specified entity in the webpage to be recognized, and encoding a relative layout information between each two text blocks, to obtain a position encoding result;

constructing a triple by the position encoding result for each two text blocks and the text encoding results for respective specified entities of the two text blocks; and performing a graph convolution on each triple to obtain a relation recognition result for the webpage to be recognized, wherein the relation recognition result indicates whether an association exists between each two text blocks included in the webpage to be recognized.

According to another aspect of the present disclosure, a model training method is provided, including:

extracting a plurality of specified entities from a source file of a sample webpage by using an entity extraction model in an entity recognition model, and determining a text encoding result for each specified entity;

determining a text block formed by each specified entity in the sample webpage, and encoding a relative layout information between each two text blocks by using a position encoding model in the entity recognition model, to obtain a position encoding result; constructing a triple by the position encoding result for each two text blocks and the text encoding results for respective specified entities of the two text blocks;

performing a graph convolution on each triple by using a graph convolution model in the entity recognition model, to obtain a relation recognition result for the sample webpage, wherein the relation recognition result indicates whether an association exists between each two text blocks included in the sample webpage; and training the entity recognition model according to the position encoding result for each two text blocks and a relation tag, to obtain a trained entity recognition model, wherein the relation tag indicates whether an actual association exists between two text blocks.

According to another aspect of the present disclosure, an electronic device is provided, including:

at least one processor; and a memory communicatively connected to the at least one processor, where the memory stores instructions executable by the at least one processor, and the instructions, when executed by the at least one processor, are configured to cause the at least one processor to implement the methods described above.

According to another aspect of the present disclosure, a non-transitory computer-readable storage medium having computer instructions therein is provided, and the computer instructions are configured to cause a computer to implement the methods described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure. In the drawings:

FIG. 3 shows a flowchart of another entity recognition method provided by an embodiment of the present disclosure;

FIG. 5 shows a flowchart of a method of acquiring a position encoding result provided by an embodiment of the present disclosure;

FIG. 7 shows a flowchart of a model training method provided by an embodiment of the present disclosure;

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Currently, before performing various information extraction tasks, a natural language processing model needs to be pre-trained, and samples for the information extraction task are used to fine tune the trained natural language processing model to obtain an information extraction model. Then, the information extraction model is used to extract desired entities from a webpage. Existing natural language processing models include a Transformer model, a Bidirectional Encoder Representations from Transformers (BERT) model, or a LayoutLM model, among which the LayoutLM model is a document understanding model based on the BERT model as a backbone network.

These natural language processing models can only extract the desired entities from webpages but cannot determine whether an association exists between the extracted entities. For example, the information extraction task is to extract all Points of Interest (POIs) and corresponding phone numbers from a webpage, while current natural language processing models can only extract a set of POIs and a set of phone numbers from the webpage, but cannot determine whether an association exists between each extracted POI and each extracted phone number.

Figure 1:
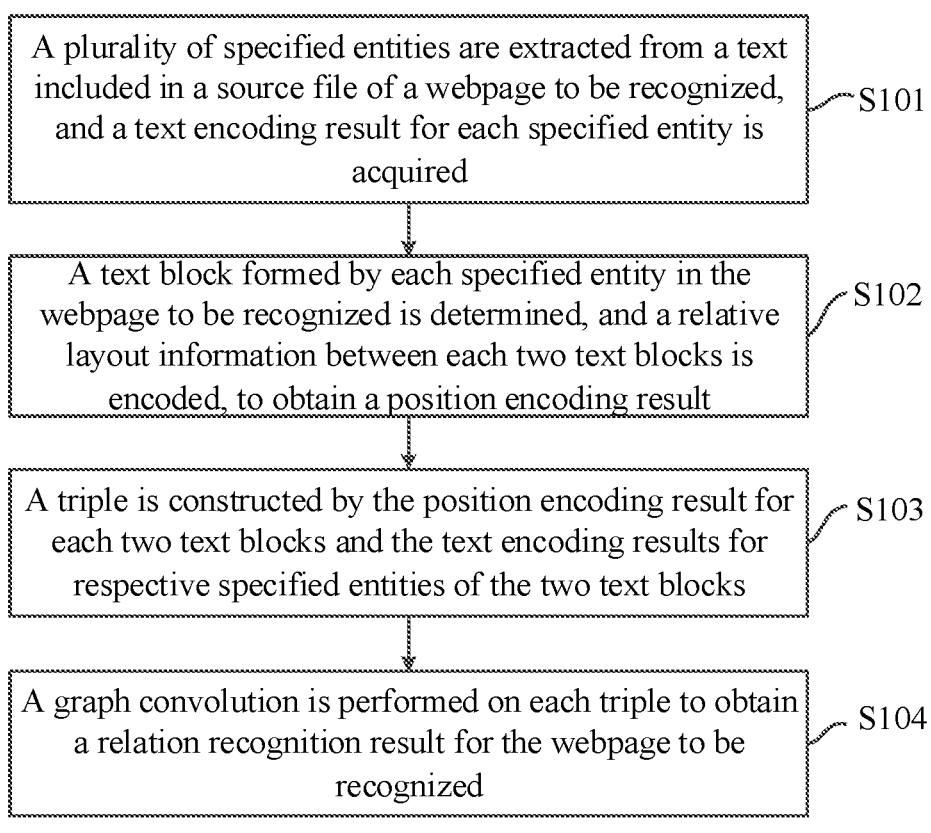
FIG. 1 shows a flowchart of an entity recognition method provided by an embodiment of the present disclosure.

On the basis of extracting the desired entities, in order to determine whether an association exists between the extracted entities, an entity recognition method is provided in embodiments of the present disclosure, which may be applied to an electronic device, such as a server, a desktop computer, or a laptop with a text processing capability. As shown in FIG. 1, the method includes steps S101 to S104.

In step S101, a plurality of specified entities are extracted from a text included in a source file of a webpage to be recognized, and a text encoding result for each specified entity is acquired.

The specified entity is a text related to a Point of Interest, and the POI is preset. For example, the POI is a name, a phone number, a time, an email and/or an address, etc.

A pre-trained natural language processing model may be used to extract the specified entities and determine the text encoding result. Alternatively, the method described below may be used to extract the specified entities and determine the text encoding result.

In step S102, a text block formed by each specified entity in the webpage to be recognized is determined, and a relative layout information between each two text blocks is encoded, to obtain a position encoding result.

Optical Character Recognition (OCR) tools may be used to recognize the text block in the webpage to be recognized.

The text block is a display area where a bounding rectangle of a text is located on the display frame of the webpage to be recognized.

For example, each line of consecutive text in a webpage to be recognized is recognized using an OCR tool, and it is determined, from each recognized line of text, whether a text content that is the same as any specified entity exists. If the text content exists, a bounding rectangle area where the text content is located is used as a text block.

Figure 2:
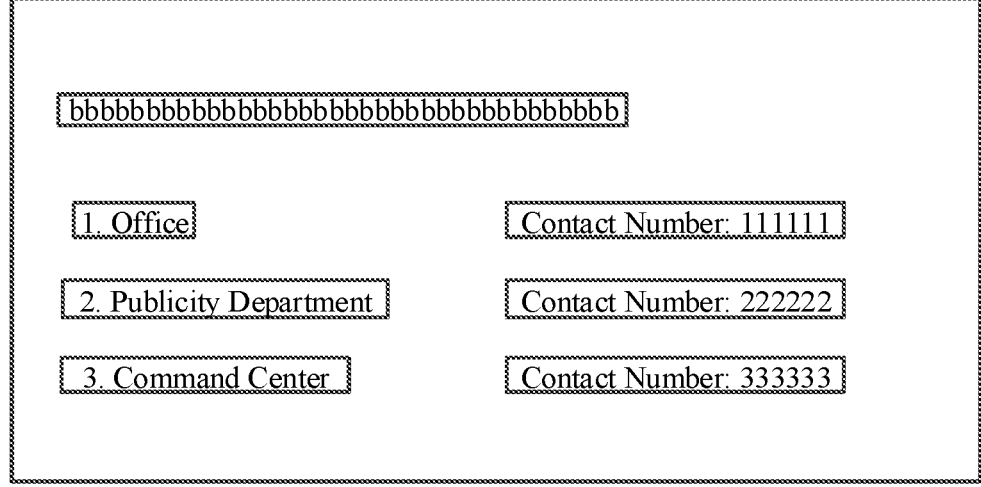
FIG. 2 shows an exemplary schematic diagram of a text block provided by an embodiment of the present disclosure.

For example, FIG. 2 shows a webpage. If the specified entities include "1. Office", "Contact Number: 111111", "2. Publicity Department", "Contact Number: 222222", "3. Command Center", and "Contact Number: 333333", then the text content area containing any specified entity may be used as a text block. That is, each of the six box areas below "bbbbbbbbbbbbbbbbbbbbbbbbbbbbbbbbbbbbb" in FIG. 2 is used as a text block.

In step S103, a triple is constructed by the position encoding result for each two text blocks and the text encoding results for respective specified entities of the two text blocks.

For example, each triple is $(n_i, r_{ij}, n_j)$, where $n_i$ is a text encoding result for text block i, $n_j$ is a text encoding result for text block j, and $r_{ij}$ is a position encoding result for text block i and text block j.

In step S104, a graph convolution is performed on each triple to obtain a relation recognition result for the webpage to be recognized.

The relation recognition result indicates whether an association exists between each two text blocks in the webpage to be recognized.

A pre-trained recognition model may be used to determine the relation recognition result. Alternatively, the entity recognition result and the relation recognition result may be determined using the methods described below.

In embodiments of the present disclosure, the plurality of specified entities are extracted from the source file of the webpage to be recognized, and the text encoding result for each specified entity is acquired. The text block formed by each specified entity in the webpage to be recognized is determined, and the relative layout information between each two text blocks is encoded to obtain the position encoding result. The graph convolution is performed on the triple constructed by the text encoding results and the position encoding result to determine whether an association exists between each two text blocks. The determination of the relation between texts is not only related to the content of the texts, but also to the relative layout information of the texts when displayed on the webpage. Thus, by using embodiments of the present disclosure, the entity extraction is performed on the webpage according to the text and its layout information in the webpage. This may not only recognize the desired specified entities in the webpage, but also recognize whether an association exists between the specified entities in the webpage.

In embodiments of the present disclosure, before extracting the plurality of specified entities from the text included in the source file of the webpage to be recognized in step S101, a tokenization may be performed on the text in the source file.

As the source file may be in Hyper Text Markup Language (HTML) format, for each element in the source file, HTML tags of the element may be filtered out to obtain the text, and a tokenization may be performed on the text. Each word obtained through the tokenization is referred to as a token, and the tokenization may be performed on the text by using a Chinese tokenizer trained based on the BERT model.

After performing the tokenization on the text in each element, data cleaning may also be performed on the tokenization result, such as deleting empty and invalid values in the tokenization result.

In some embodiments of the present disclosure, as shown in FIG. 3, extracting the plurality of specified entities from the text included in the source file of the webpage to be recognized and acquiring the text encoding result for each specified entity in step S101 may include steps S301 to S306.

In step S301, a word embedding processing is performed on a path of each element in the source file by using an entity extraction model in an entity recognition model, to obtain a path embedding vector for each element.

The entity extraction model includes a word embedding layer, for example, the word embedding layer is an embedding layer of BERT.

The path of each element in the source file may include element information of elements passed from a root element of the source file to that element. The element information may include a tag and a serial number of an element.

For example, the path of element i in the source file may be represented as:

$$p_i = \left[ (t_0^i, s_0^i), (t_1^i, s_1^i), (t_2^i, s_2^i), \dots (t_d^i, s_d^i) \right],$$

where $$t_0^i \text{ to } t_d^i$$

each represents a tag of each element in the path, $$s_0^i$$

to $$s_d^i$$

each represents a serial number of each element in the path, and d represents the number of elements in the path, i.e. a level of element i in the source file, which is a depth of a node corresponding to element i in a Document Object Model (DOM) tree constructed based on the source file.

The word embedding layer may process the tag and the serial number of each element in the path separately. A word embedding vector for each element in the path is:

$$xe_j^i = TagEmbedding(t_j^i) + SubscriptEmbedding(s_j^i) \qquad (1)$$

where $$xe_j^i$$

represents a word embedding vector for element j being passed by in the path of element i, $$TagEmbedding(t_j^i)$$

represents a tag embedding result of element j being passed by in the path of element i, $$SubscriptEmbedding(s_j^i)$$

represents an embedding result for the serial number of element j being passed by in the path of element i, j∈ [0, d], and d is the number of elements in the path.

The path embedding vector for each element is:

$$e_{xpath}^i = \left[ xe_0^i; xe_1^i; \dots ; xe_d^i \right] \qquad (2)$$

where $$e_{xpath}^i$$

represents a path embedding vector for element i, $$xe_0^i$$

is a word embedding vector for element 0 being passed by in the path of element i, $$xe_1^i$$

is a word embedding vector for element 1 being passed by in the path of element i, and so on, and $$xe_d^i$$

is a word embedding vector for element d being passed by in the path of element i.

In step S302, a word embedding processing is performed by using the entity extraction model on a level of each element in the source file, an index of each element, and a position of each word of each element in a text content to which the word belongs, to obtain a position embedding vector for each element.

The word embedding processing may be performed by using the word embedding layer of the entity extraction model on the level of each element in the source file, the index of each element, and the position of each word of each element in the text content to which the word belongs, to obtain a position embedding vector $$e_{pos}^i$$

for each element.

$$e^i_{pos} = [p_1, p_2, p_3] \tag{3}$$

where $$e^i_{pos}$$

represents a position embedding vector for element i, $p_1$ is a word embedding vector for the level of element i in the source file, $p_2$ is a word embedding vector for the index of element i, and $p_3$ is a word embedding vector for the position of each word of element i in the text content to which the word belongs.

In embodiments of the present disclosure, the position embedding vector is determined according to the combination of the level of the element in the source file, the index of the element, and the position of each word of the element in the text content to which the word belongs. Thus, more factors are taken into account than only considering the position of the word in the corresponding text content. Moreover, the level of the element in the source file and the index of the element may reflect a structure of the element in the source file, and the element structure affects whether an association exists between the texts included in the elements. Therefore, in embodiments of the present disclosure, the recognition is performed based on the position embedding vector, so that the obtained specified entities and the relation recognition result are more accurate.

In step S303, a word embedding processing is performed on a word included in each element by using the entity extraction model, to obtain a token embedding vector for each element and a segment embedding vector for each element.

The word embedding processing may be performed on the word of each element by using the word embedding layer of the entity extraction model, to obtain a token embedding vector for each element and a segment embedding vector for each element. The value of each dimension in the token embedding vector is a vector transformation result for a token of the element; and the value of each dimension in the segment embedding vector represents a serial number of a sentence to which a token of the element belongs in all sentences included in the element.

In step S304, the path embedding vector, the position embedding vector, the token embedding vector, and the segment embedding vector for each element are encoded by using the entity extraction model, to obtain an encoding result for each element.

The entity extraction model also includes an encoding layer and a pooling layer. The encoding layer may be an encoding layer of a Transformer model.

The path embedding vector, the position embedding vector, the token embedding vector, and the segment embedding vector for each element may be combined to obtain a combination vector.

$$e_{word} = e_{text} + e_{pos} + e_{seg} + e_{xpath} \tag{4}$$

where $e_{word}$ is a combination vector of an element, $e_{text}$ is a token embedding vector for the element, $e_{pos}$ is a position embedding vector for the element, $e_{seg}$ is a segment embedding vector for the element, and $e_{xpath}$ is a path embedding vector for the element.

Afterwards, the combination vector is input into the encoding layer to obtain a hidden layer representation by encoding the combination vector in the encoding layer:

$$h^{(i)}_{1:T} = TransformerEncoder\left(e^{(i)}_{world}; \theta_t\right) \tag{5}$$

where $$h^{(i)}_{1:T}$$

represents a hidden layer representation output by an i-th hidden layer of the encoding layer, $$e^{(i)}_{word}$$

is a combination vector for element i, $\theta_t$ represents a network parameter of the encoding layer, and $\theta_t$ may be adjusted during model training, T is a length of text content in element i, $$e^{(i)}_{word}$$

represents a combination vector v for element i. TransformerEncoder represents an encoding processing from the first hidden layer to the i-th hidden layer of the encoding layer.

The last hidden layer representation $$h^{(N)}_{1:T}$$

of the encoding layer is input into the pooling layer to obtain an encoding result for each element output by the pooling layer. The encoding result may be referred to as a text content representation TE.

In step S305, the encoding result for each element is recognized by using the entity extraction model, to obtain a specified entity in a text content of each element.

The entity extraction model may also include a Multi-Layer Perceptron (MLP) layer and a normalized exponential function (softmax) layer. The encoding result for each element passes through the MLP layer and the softmax layer to obtain a probability of each field in the text of the element being the specified entity. A field with a probability greater than a preset probability is used as the specified entity.

The specified entity may or may not exist in the text content of each element.

In step S306, it is determined that the text encoding result for each specified entity is the encoding result for the element to which the specified entity belongs.

Through the above methods, embodiments of the present disclosure may be implemented to determine that the text encoding result for each specified entity is the encoding result for the element to which the specified entity belongs. Moreover, in embodiments of the present disclosure, when encoding the text of the element, not only the text content is considered, but also the path of the element including the text in the source file, the depth, and the index are considered, which is equivalent to considering the structural information of the element in the source file. This makes the result of subsequent entity recognition and relation recognition based on the text encoding result more accurate.

Before performing step S301, the path of each element in the source file may be determined by constructing a DOM tree based on the source file and acquiring a path expression of the node corresponding to each element in the DOM tree, as the path of the element in the source file.

It may be understood that the source file is composed of a plurality of elements, and parent-child relations among the elements are recorded in the source file. Therefore, a DOM tree may be constructed based on the source file, and each node in the DOM tree corresponds to an element in the source file.

The path expression of the node in the DOM tree may be an Extensible Markup Language Path (XPath) expression. The XPath expression of a node represents information of each node passed from the root node of the DOM tree to that node. For example, an XPath expression for node 5 is "HTML/body/div[5]", in which different node information is divided by "/", "HTML" is the tag of the root node; "body" is the tag of an intermediate node; "div" is the tag of node 5; and "5" is the subscript of node 5, i.e. the serial number of node 5.

For a node without an XPath expression, such as a HTML tag, a specified identifier may be used to represent the XPath expression of the node. For example, the specified identifier is "[PAD]".

Texts in webpages contain more relevant information than texts in ordinary files. For example, in addition to text content, the texts in webpages also include tag information of the elements to which the texts belong and path information of the elements in the source file, so as to reflect the structural information between nodes. The existence of association between the texts depends on the structure between the nodes to which the texts belong. Therefore, in embodiments of the present disclosure, by encoding the XPath expression of the node corresponding to the element where the text is located, the result of subsequent entity recognition and relation recognition based on the path embedding vector are more accurate.

Figure 4:
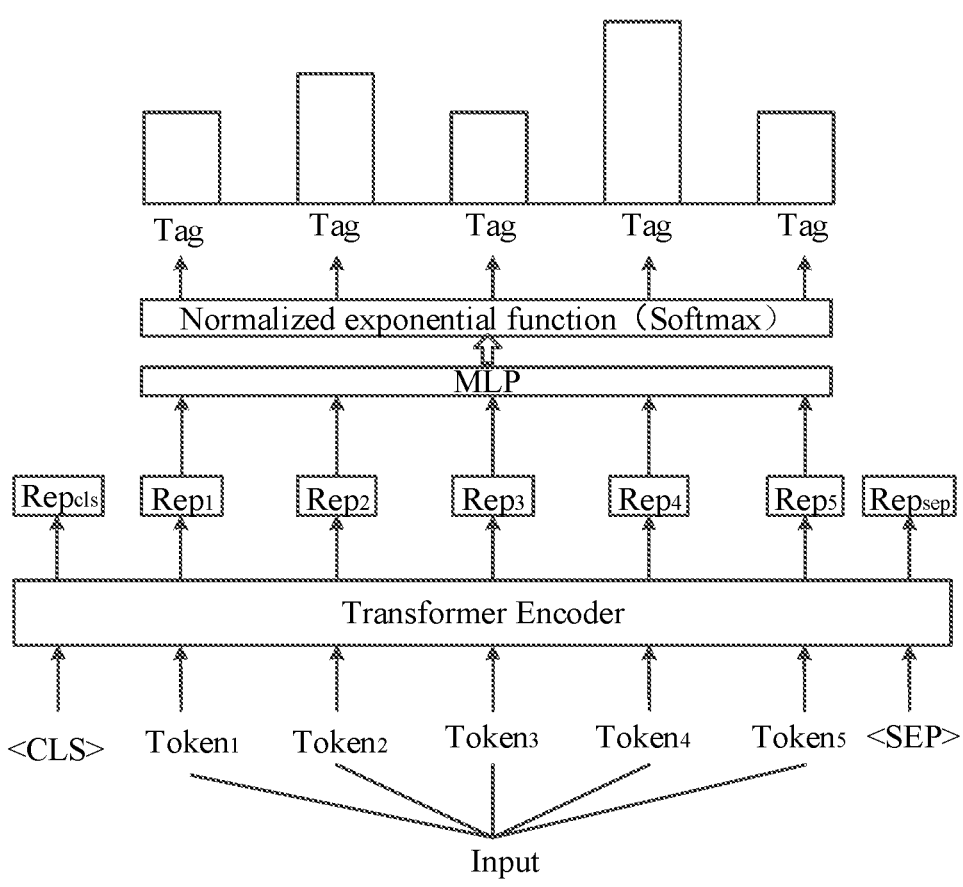
FIG. 4 shows an exemplary schematic diagram of an entity recognition process provided by an embodiment of the present disclosure.

Referring to FIG. 4, an example of the entity recognition process is illustrated.

The "Input" represents a sentence. <CLS>, Token$_1$ to Token$_5$, and <SEP> are obtained after performing a tokenization on the sentence, where <CLS> represents the beginning of the sentence, and <SEP> represents the end of the sentence. A word embedding processing is performed on the tokenization result to obtain a path embedding vector, a position embedding vector, a token embedding vector, and a segment embedding vector. The path embedding vector, the position embedding vector, the token embedding vector, and the segment embedding vector are input into a Transformer Encoder, which is the encoding layer of the Transformer model, to obtain an encoding result, i.e. Rep$_{cls}$ to Rep$_{sep}$ in FIG. 4. Afterwards, the Rep$_{cls}$ to Rep$_{sep}$ are input into a MLP, and an output result of the MLP is input into a Softmax, so that the Softmax may output a probability of each field in the sentence being a specified entity. The bar above each tag in FIG. 4 represents the probability of a field being a specified entity, and the higher the bar, the greater the probability.

In some embodiments of the present disclosure, the encoding the relative layout information between each two text blocks to obtain the position encoding result in S102 includes the following three methods.

Referring to FIG. 5, one of the methods for obtaining the position encoding result in S102 above includes steps S501 to S506.

In step S501, display coordinates of each text block, a dimension of each text block, and a character length of each text block are acquired.

The relative layout information between the text blocks includes a relative position, a relative size, a character length ratio, and a depth ratio. The display coordinates are coordinates of a specified point within the text block in the webpage to be recognized. For example, the display coordinates of the text block are coordinates of a center point within the text block in the webpage to be recognized.

In step S502, a relative position between each two text blocks is determined according to the display coordinates of the two text blocks.

In embodiments of the present disclosure, the display coordinates include a horizontal coordinate and a vertical coordinate. In this way, when determining the relative position between each two text blocks, a difference between the horizontal coordinates of the two text blocks may be calculated to obtain a width difference between the two text blocks, i.e. a width difference $x_{ij}=|x_i-x_j|$, where $x_{ij}$ is the width difference between text block i and text block j, $x_i$ is the horizontal coordinate of text block i, and $x_j$ is the horizontal coordinate of text block j. Furthermore, a difference between the vertical coordinates of the two text blocks may be calculated to obtain a height difference between the two text blocks, i.e. a height difference $y_{ij}=y_i-y_j$, where $y_{ij}$ is the height difference between text block i and text block j, $y_i$ is the vertical coordinate of text block i, and $y_j$ is the vertical coordinate of text block j.

In step S503, the relative size between each two text blocks is determined according to the dimensions of the two text blocks.

In embodiments of the present disclosure, the dimension of the text block includes a height and a width. In this way, when calculating the relative size between each two text blocks, a ratio of the widths between the two text blocks may be calculated to obtain a width ratio between the two text blocks, that is, a width ratio of text block i to text block j is $$\frac{w_i}{w_j},$$

where $w_i$ is the width of text block i, and $w_j$ is the width of the text block j.

Furthermore, a ratio of the heights between the two text blocks may be calculated to obtain a height ratio between the two text blocks, that is, a height ratio of text block i to text block j is $$\frac{h_i}{h_j},$$

where $h_i$ is the height of text block i, and $h_j$ is the height of the text block j.

In addition, by comparing aspect ratios of the text blocks, it is also possible to reflect the relative layout between the text blocks. Therefore, a ratio of the width to the height of each text block may also be calculated to obtain the aspect ratio of each text block, that is, the two aspect ratios of text block i and text block j are $$\frac{w_i}{h_i} \text{ and } \frac{w_j}{h_j},$$

respectively, where $w_i$ is the width of text block i, $h_i$ is the height of text block i, $w_j$ is the width of the text block j, and $h_j$ is the height of text block j.

In step S504, the character length ratio of each two text blocks is calculated according to the character lengths of the two text blocks.

The character length ratio of text block i to text block j is $$\frac{L_i}{L_j},$$

where $L_i$ is the character length of text block i, and $L_j$ is the character length of text block j.

In step S505, the depth ratio of each two text blocks is calculated according to path depths of elements in the source file, where specified entities of the two text blocks belong to the elements, respectively.

The depth ratio of text block i to text block j is $$\frac{D_i}{D_j},$$

where $D_i$ is a path depth of an element to which the specified entity of text block i belongs in the source file, and $D_j$ is a path depth of an element to which the specified entity of text block j belongs in the source file.

The path depth of the element to which the specified entity of the text block belongs in the source file is a depth of the node corresponding to the element in the Document Object Model (DOM) tree constructed based on the source file.

In step S506, the relative position between each two text blocks, the relative size between each two text blocks, the character length ratio of each two text blocks, and the depth ratio of each two text blocks are encoded by using a position encoding model in an entity recognition model, to obtain the position encoding result.

The position encoding result is:

$$r_{ij} = W_\alpha \left[ x_{ij}, y_{ij}, \frac{w_i}{h_i}, \frac{w_j}{h_j}, \frac{w_i}{w_j}, \frac{h_i}{h_j}, \frac{L_i}{L_j}, \frac{D_i}{D_j} \right]^T \quad (6)$$

where $r_{ij}$ is the position encoding result for text block i and text block j, $W_\alpha$ is a weight parameter of the position encoding model which is adjustable in training, $x_{ij}$ is the width difference between text block i and text block j, $y_{ij}$ is the height difference between text block i and text block j, $w_i$ is the width of text block i, $h_i$ is the height of text block i, $w_j$ is the width of the text block j, $h_j$ is the height of text block j, $L_i$ is the character length of text block i, $L_j$ is the character length of text block j, $D_i$ is a path depth of an element to which the specified entity of text block i belongs in the source file, $D_j$ is a path depth of an element to which the specified entity of text block j belongs in the source file, and T represents a transpose of the matrix.

The relative position of text blocks in a webpage affects whether an association exists between the content of the text blocks. For example, the closer the distance between text blocks, the greater the possibility of the association. The relative size of text blocks in a webpage also affects whether an association exists between the content of the text blocks. For example, the smaller the difference in dimension between text blocks, the greater the possibility of the association. The character length ratio of text blocks in a webpage also affects whether an association exists between the content of the text blocks. For example, the smaller the difference in character length between text blocks, the greater the possibility of the association. The depth ratio of the elements to which the text blocks belong in the source file also affects whether an association exists between the content of the text blocks. For example, the smaller the depth ratio between text blocks, the greater the possibility of the association. Therefore, embodiments of the present disclosure take the relative position, the relative size, the character length ratio, and the depth ratio of each two text blocks into account, which may determine the relation recognition result for the webpage more accurately.

In some embodiments of the present disclosure, the relative layout information includes a relative position. A second method for obtaining the position encoding result in S102 above includes the following steps. Display coordinates of each text block are acquired. The relative position between each two text blocks is determined according to the display coordinates of the two text blocks. The relative position between each two text blocks is encoded by using a position encoding model in an entity recognition model, to obtain the position encoding result.

The relative position of text blocks in a webpage affects whether an association exists between the content of the text blocks. Therefore, embodiments of the present disclosure take the relative position of the text blocks into account, which may determine the relation recognition result for the webpage more accurately.

In some embodiments of the present disclosure, the relative layout information includes a relative position and a relative size. A third method for obtaining the position encoding result in S102 above includes the following steps. Display coordinates of each text block and a dimension of each text block are acquired. The relative position between each two text blocks is determined according to the display coordinates of the two text blocks. The relative size between each two text blocks is determined according to the dimensions of the two text blocks. The relative position between each two text blocks and the relative size between each two text blocks are encoded by using a position encoding model in an entity recognition model, to obtain the position encoding result.

Both the relative position and the relative size of text blocks in a webpage affect whether an association exists between the content of the text blocks. Therefore, embodiments of the present disclosure take the relative position and the relative size of the text blocks into account, which may determine the relation recognition result for the webpage more accurately.

Specific implementation of each step in the second method and the third method for obtaining the position encoding result in step S102 may be referred to the relevant description with reference to FIG. 3, which will not be repeated here.

The text encoding results are obtained in step S101 and the position encoding result is obtained in step S102. Based on this, for each two text blocks, a triple $(n_i, r_{ij}, n_j)$ may be constructed by the text encoding results for respective specified entities of the two text blocks and the position encoding result for the two text blocks, where $n_i$ is the text encoding result for text block i, n is the text encoding result for text block j, and ry is the position encoding result for text block i and text block j.

After obtaining the triple corresponding to each two text blocks, each triple may be displayed in a form of a feature map, where each node in the feature map represents the text encoding result for each text block, and a relation between each two nodes represents the position encoding result between the two text blocks.

In embodiments of the present disclosure, performing the graph convolution on each triple to obtain the relation recognition result for the webpage to be recognized in step S104 may be achieved by performing the graph convolution on each triple by using a graph convolution model in the entity recognition model to obtain a graph convolution result.

The graph convolution model may be a graph convolution network (GCN), which includes a plurality of MLPs, each MLP includes concatenated hidden layers, at least one self-attention layer, and a convolutional layer.

An output result of the first hidden layer of the first MLP in the graph convolution model is:

$$h_{ij}^0 = g(n_i, r_{ij}, n_j) = MLP([n_i \| r_{ij} \| n_j]) = \sigma\left(W_{n_ih}^0 n_i + W_{n_jh}^0 n_j + r_{ij} + b^0\right) \quad (7)$$

where $$h_{ij}^0$$

is an output result of hidden layer 0 on text block i and text block j, that is, an output result of the first hidden layer on a triple constructed by text block i and text block j. g represents a function, MLP represents a processing of the hidden layer of MLP, σ represents a non-linear activation function, σ(·)=max(0,·), $$W_{n_ih}^0 \text{ and } W_{n_jh}^0$$

are weight parameters of the first hidden layer, $b^0$ is a bias parameter of the first hidden layer, and $$W_{n_ih}^0 \text{ and } W_{n_jh}^0$$

may be adjusted during model training.

The method that other hidden layers calculate the output results is similar to that of the first hidden layer, except that the input data is different from that of the first hidden layer. For example, the input data of one of other hidden layers is an output result of a previous hidden layer. Therefore, the output results of other hidden layers will not be repeated.

Afterwards, the output result $$h_{ij}^l$$

of the last hidden layer is input into the self-attention layer and the convolutional layer.

A text feature of the text block output by the self-attention layer is:

$$n_i^{l+1} = \sigma\left(\sum_{j \in \{1,2,\dots,N\}} \alpha_{ij} h_{ij}^l\right) \quad (8)$$

where $$n_i^{l+1}$$

is a text feature of text block i output by self-attention layer (l+1), σ represents a non-linear activation function, σ(·)=max(0,·), $\alpha_{ij}$ is a self-attention coefficient centered on text block i, $$h_{ij}^l$$

is an output result of hidden layer l for the triple constructed by text block i and text block j, and N is the number of text blocks in the webpage to be recognized.

$$\alpha_{ij} = \frac{\exp\left(LeakyRelu\left(W_a^T h_{ij}^l\right)\right)}{\sum_{j \in \{1,2,\dots,N\}} \exp\left(LeakyRelu\left(W_a^T h_{ij}^l\right)\right)} \quad (9)$$

where exp represents an exponential function based on a natural constant e, LeakyRelu represents a leaky rectifier linear unit function, and $$W_a^T$$

is a weight parameter of the self-attention layer, $$W_a^T$$

may be adjusted during model training, and $$h_{ij}^l$$

is the output result of the mapping layer l.

The serial number of each mapping layer and each self-attention layer in the graph convolution model is obtained by encoding each mapping layer and each self-attention layer as a whole. For example, the first mapping layer has a serial number of 0, the first self-attention layer has a serial number of 1, the second mapping layer has a serial number of 2, the second self-attention layer has a serial number of 3, and so on.

A relation feature between each two text blocks output by the self-attention layer is:

$$r_{ij}^{l+1} = \sigma\left(W_r^l h_{ij}^l\right) \qquad (10)$$

where $$r_{ij}^{l+1}$$

is a relation feature between text block i and text block j output by the self-attention layer, σ represents a non-linear activation function, $\sigma(\cdot)=\max(0,\cdot)$, $$W_r^l$$

is a weight parameter of the self-attention layer, $$W_r^l$$

may be adjusted during model training, $$h_{ij}^l$$

is an output result of the hidden layer l for the triple constructed by text block i and text block j.

Then, a triple constructed by $$n_i^{l+1}, r_{ij}^{l+1} \text{ and } n_j^{l+1}$$

is input into the next MLP, until the last MLP outputs $$n_i^K, r_{ij}^K \text{ and } n_j^K.$$

A normalization may also be performed on $$r_{ij}^K$$

for constructing an adjacency matrix P. Each P (i, j) in the adjacency matrix P is a normalization result of $$r_{ij}^K,$$

and P (i, j) represents the probability of an association between text block i and text block j, that is, a probability of an association between entity i in text block i and entity j in text block j. If P (i, j) is greater than a threshold, it is determined that an association exists between entity i and entity j. If P (i, j) is less than or equal to the threshold, it is determined that an association does not exist between entity i and entity j.

In embodiments of the present disclosure, the graph convolution model may be used to determine whether each text block in the webpage is a specified entity and whether an association exists between the text blocks, by utilizing the text encoding results of the text blocks in the webpage and the position encoding result between each two text blocks. This enriches the entity extraction of the webpage and expands the application scope of embodiments of the present disclosure.

Figure 6:
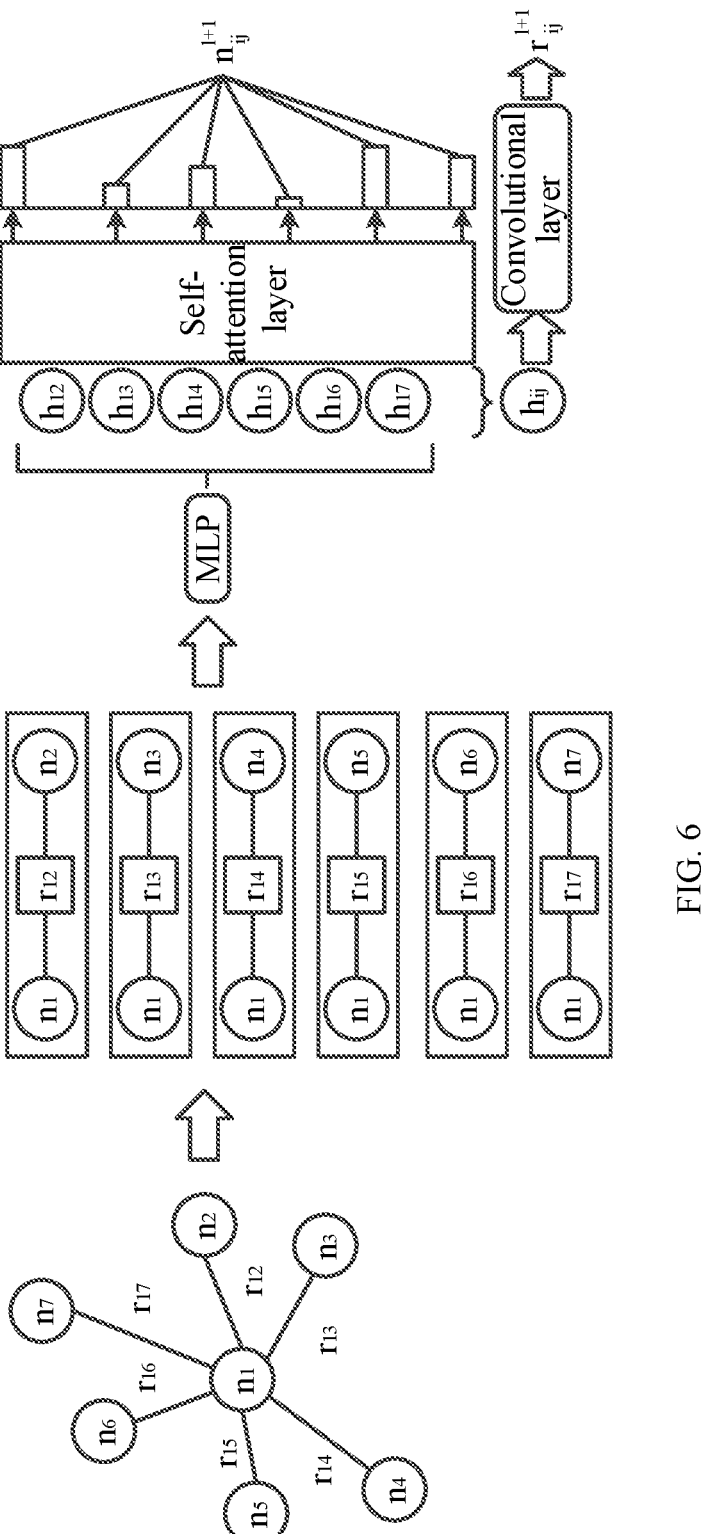
FIG. 6 shows an exemplary schematic diagram of a processing of a first MLP of a graph convolution model provided by an embodiment of the present disclosure.

Referring to FIG. 6, the processing of the first MLP in the graph convolution model is illustrated below.

The left part of FIG. 6 shows a feature map constructed by a plurality of triples. Nodes $n_1$ to $n_7$ in the feature map each represent a text encoding result for one text block, and lines connecting $n_1$ with $n_2$ to $n_7$ each represent a position encoding result for two text blocks. For example, node $n_1$ represents a text encoding result for text block 1, node $n_2$ represents a text encoding result for text block 2, and so on, node $n_7$ represents a text encoding result for text block 7. Line $r_{12}$ represents a position encoding result for text block 1 and text block 2, line $r_{13}$ represents a position encoding result for text block 1 and text block 3, and so on, and line $r_{17}$ represents a position encoding result for text block 1 and text block 7. The middle part of FIG. 6 shows the triples, for example, the first triple is composed of $n_1$, $r_{12}$, and $n_2$. The right part of FIG. 6 shows a processing of each triple by the first MLP in the graph convolution model.

The hidden layer is used to process each triple to obtain $h_{ij}$ output from the last hidden layer, where $h_{ij}$ is composed of $h_{12}$ to $h_{17}$. Afterwards, $h_{ij}$ is input into the self-attention layer and the convolutional layer to obtain an output $$n_{ij}^{l+1}$$

from the self-attention layer and an output $$r_{ij}^{l+1}$$

from the convolutional layer, respectively. Then, a triple constructed by $$n_i^{l+1}, r_{ij}^{l+1} \text{ and } n_j^{l+1}$$

is input into the next MLP, until the last MLP outputs $$n_i^K, r_{ij}^K \text{ and } n_j^K. \ r_{ij}^K$$

is used as a probability of an association between text block i and text block j.

Unlike the existing method of using graph nodes as model input, embodiments of the present disclosure adopt the form of "node-edge-node" triple as the input of the graph convolution model. As the encoding result for the edge is based on the relative layout information of the text blocks in the webpage, the triple may combine the text encoding results for the text blocks with the position encoding result that reflects visual features. As a result, when recognizing each node, the graph convolution model is able to learn potential features that need attention for entity recognition and relation recognition based on the position encoding result of the node with other nodes, thereby improving the accuracy of determining the entity recognition result and position recognition result for webpages.

Based on the same invention concept, embodiments of the present disclosure also provides a model training method applied to an electronic device, such as a server, a desktop computer, or a laptop with a text processing capability. The electronic device for implementing the entity recognition method and the electronic device for implementing the model training method may be the same device or different devices.

As shown in FIG. 7, the model training method provided in embodiments of the present disclosure may include steps S701 to S705.

In step S701, a plurality of specified entities are extracted from a source file of a sample webpage by using an entity extraction model in an entity recognition model, and a text encoding result for each specified entity is determined.

The process of extracting the specified entities by using the entity extraction model and determining the text encoding result may be referred to the relevant description in step S101 above, which will not be repeated here.

In step S702, a text block formed by each specified entity in the sample webpage is determined, and a relative layout information between each two text blocks is encoded by using a position encoding model in the entity recognition model, to obtain a position encoding result.

The process of determining the position encoding result can be referred to the relevant description in step S102 above, which will not be repeated here.

In step S703, a triple is constructed by the position encoding result for each two text blocks and the text encoding results for respective specified entities of the two text blocks.

The process of constructing the triple may be referred to the relevant description in step S103 above, which will not be repeated here.

In step S704, a graph convolution is performed on each triple by using a graph convolution model in the entity recognition model, to obtain a relation recognition result for the sample webpage.

The relation recognition result indicates whether an association exists between each two text blocks included in the sample webpage.

The process of obtaining the relation recognition result may be referred to the relevant description in step S104 above, which will not be repeated here.

In step S705, the entity recognition model is trained according to the position encoding result for each two text blocks and a relation tag, to obtain a trained entity recognition model.

The relation tag indicates whether an actual association exists between two text blocks.

In embodiments of the present disclosure, the plurality of specified entities are extracted from the source file of the webpage to be recognized, and the text encoding result for each specified entity is acquired. The text block formed by each specified entity in the webpage to be recognized is determined, and the relative layout information between each two text blocks is encoded to obtain the position encoding result. The graph convolution is performed on the triple constructed by the text encoding results and the position encoding result to determine whether an association exists between each two text blocks. The entity recognition model is trained according to the position encoding result for each two text blocks and the relation tag, so that the position encoding result is closer to the relation tag, and the recognition result of the entity recognition model is more accurate, therefore the entity recognition result and relation recognition result for the webpages obtained by using the entity recognition model later are more accurate.

In embodiments of the present disclosure, before extracting a plurality of specified entities from a text included in a source file of a sample webpage in step S701, a tokenization may be performed on the text in the source file of the sample webpage. The process of the tokenization may be referred to the description above.

In some embodiments of the present disclosure, the extracting the plurality of specified entities from the source file of the sample webpage by using the entity extraction model in the entity recognition model and determining the text encoding result for each specified entity in step S701 may include the following steps.

In step (1), a word embedding processing is performed on a path of each element in the source file by using the entity extraction model, to obtain a path embedding vector for each element.

The specific implementation of step (1) may be referred to the relevant description in step S301 above, which will not be repeated here.

In step (2), a word embedding processing is performed by using the entity extraction model on a level of each element in the source file, an index of each element, and a position of each word of each element in a text content to which the word belongs, to obtain a position embedding vector for each element.

The specific implementation of step (2) may be referred to the relevant description in step S302 above, which will not be repeated here.

In step (3), a word embedding processing is performed on a word included in each element by using the entity extraction model, to obtain a token embedding vector for each element and a segment embedding vector for each element.

The specific implementation of step (3) may be referred to the relevant description in step S303 above, which will not be repeated here.

In step (4), the path embedding vector, the position embedding vector, the token embedding vector, and the segment embedding vector for each element are encoded by using the entity extraction model, to obtain an encoding result for each element.

The specific implementation of step (4) may be referred to the relevant description in step S304 above, which will not be repeated here.

In step (5), the encoding result for each element is recognized by using the entity extraction model, to obtain a specified entity in a text content of each element.

The specific implementation of step (5) may be referred to the relevant description in step S305 above, which will not be repeated here.

In step (6), it is determined that the text encoding result for each specified entity is the encoding result for the element to which the specified entity belongs.

The specific implementation of step (6) may be referred to the relevant description in step S306 above, which will not be repeated here.

Through the above method, embodiments of the present disclosure may be implemented to determine that the text encoding result for each specified entity is the encoding result for the element to which the specified entity belongs. Moreover, in embodiments of the present disclosure, when encoding the text of the element, not only the text content is considered, but also the path of the element in the source file, the depth, and the index are considered, which is equivalent to considering the structural information of the element in the source file. This makes the result of subsequent entity recognition and relation recognition based on the text encoding result more accurate.

Before performing step (1), the path of each element in the source file may be determined by constructing a DOM tree based on the source file and acquiring a path expression of the node corresponding to each element in the DOM tree, as the path of the element in the source file.

The method of determining the path of the element in the source file may be referred to the above description, which will not be repeated here.

Texts in webpages contain more relevant information than texts in ordinary files. For example, in addition to text content, the texts in webpages also include tag information of the elements to which the texts belong and path information of the elements in the source file, so as to reflect the structural information between nodes. The existence of association between the texts depends on the structure between the nodes to which the texts belong. Therefore, in embodiments of the present disclosure, by encoding the XPath expression of the node corresponding to the element to which the text belongs, the result of subsequent entity recognition and relation recognition based on the path embedding vector are more accurate.

In some embodiments of the present disclosure, encoding the relative layout information between each two text blocks to obtain the position encoding result in S702 includes the following three methods.

A first method for obtaining the position encoding result in S702 above includes the following steps.

In step 1, display coordinates of each text block, a dimension of each text block, and a character length of each text block are acquired. The relative layout information between the text blocks includes a relative position, a relative size, a character length ratio, and a depth ratio. The display coordinates are coordinates of a specified point within the text block in the sample webpage.

In step 2, the relative position between each two text blocks is determined according to the display coordinates of the two text blocks.

In step 3, the relative size between each two text blocks is determined according to the dimensions of the two text blocks.

In step 4, the character length ratio of each two text blocks is calculated according to the character lengths of the two text blocks.

In step 5, the depth ratio of each two text blocks is calculated according to path depths of elements in the source file, where specified entities of the two text blocks belong to the elements, respectively.

In step 6, the relative position between each two text blocks, the relative size between each two text blocks, the character length ratio of each two text blocks, and the depth ratio of each two text blocks are encoded by using the position encoding model, to obtain the position encoding result.

The specific implementation of the first method may be referred to the relevant description with reference to FIG. 5, which will not be repeated here.

The relative position of the text blocks in the webpage affects whether an association exists between the content of the text blocks. For example, the closer the distance between text blocks, the greater the possibility of the association. The relative size of text blocks in a webpage also affects whether an association exists between the content of the text blocks. For example, the smaller the difference in dimension between text blocks, the greater the possibility of the association. The character length ratio of text blocks in a webpage also affects whether an association exists between the content of the text blocks. For example, the smaller the difference in character length between text blocks, the greater the possibility of the association. The depth ratio of the elements to which the text blocks belong in the source file also affects whether an association exists between the content of the text blocks. For example, the smaller the depth ratio between text blocks, the greater the possibility of the association. Therefore, embodiments of the present disclosure take the relative position, the relative size, the character length ratio, and the depth ratio of each two text blocks into account, which may determine the relation recognition result for the webpage more accurately.

In some embodiments of the present disclosure, the relative layout information includes a relative position. Accordingly, a second method for obtaining the position encoding result in S702 above includes the following steps. Display coordinates of each text block are acquired. The relative position between each two text blocks is determined according to the display coordinates of the two text blocks. The relative position between each two text blocks is encoded by using the position encoding model, to obtain the position encoding result.

The specific implementation of the second method may be referred to the relevant description with reference to FIG. 5, which will not be repeated here.

The relative position of the text blocks in the webpage affects whether an association exists between the content of the text blocks. Therefore, embodiments of the present disclosure take the relative position of the text blocks into account, which may determine the relation recognition result for the webpage more accurately.

In some embodiments of the present disclosure, the relative layout information includes a relative position and a relative size. In this way, a third method for obtaining the position encoding result in S702 above includes the following steps. Display coordinates of each text block and a dimension of each text block are acquired. The relative position between each two text blocks is determined according to the display coordinates of the two text blocks. The relative size between each two text blocks is determined according to the dimensions of the two text blocks. The relative position between each two text blocks and the relative size between each two text blocks are encoded by using the position encoding model, to obtain the position encoding result.

The specific implementation of the third method may be referred to the relevant description with reference to FIG. 5, which will not be repeated here.

Both the relative position and the relative size of the text blocks in the webpage affect whether an association exists between the content of the text blocks. Therefore, embodiments of the present disclosure take the relative position and the relative size of the text blocks in the webpage into account, which may determine the relation recognition result for the webpage more accurately.

Figure 8:
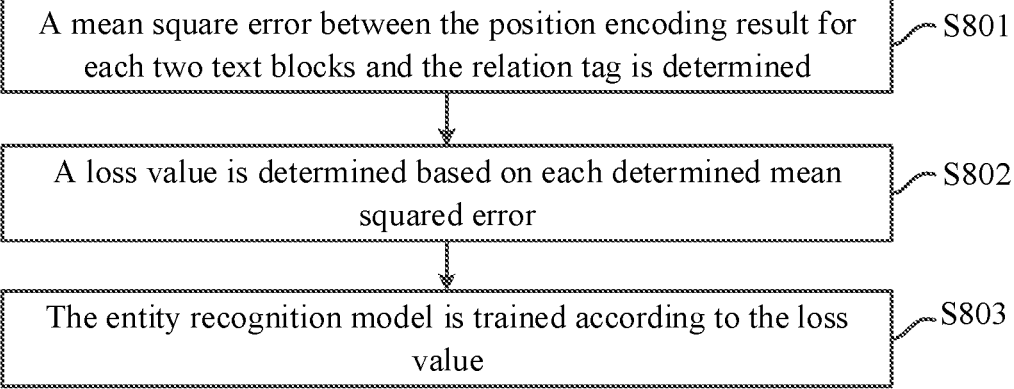
FIG. 8 shows a flowchart of a method of training an entity recognition model provided by an embodiment of the present disclosure.

In some embodiments of the present disclosure, as shown in FIG. 8, the training the entity recognition model according to the position encoding result for each two text blocks and the relation tag in step S705 includes steps S801 to S803.

In step S801, a mean square error between the position encoding result for each two text blocks and the relation tag is determined.

A normalization may be performed on the position encoding result to obtain an adjacency matrix P:

$$P = \sum_{(i,j) \in \Omega^+ \Omega^-} P(i, j), \ P(i, j) = \text{softmax}(r_{ij}) \qquad (11)$$

where P is the adjacency matrix, $\Omega^+$ represents a set of positive sample serial numbers, each positive sample serial number represents a serial number of two text blocks that have an actual association, $\Omega^-$ represents a set of negative sample serial numbers, each negative sample serial number represents a serial number of two text blocks that do not have an actual association, $r_{ij}$ is the position encoding result for text block i and text block j, and softmax is a normalized exponential function processing.

Then, the mean square error between the P (i, j) of each two text blocks and the relation tag is calculated.

In step S802, a loss value is determined based on each determined mean squared error.

By determining the loss value based on the mean square error between the position encoding result for each two text blocks and the relation tag, the entity recognition model may be optimized with the goal of minimizing the loss function, thereby improving the accuracy of the entity recognition model in determining the position encoding result, and thus improving the accuracy of the entity recognition result and the relation recognition result.

For example, a sum of the mean square errors may be used as the loss value.

Alternatively, the loss value may be calculated using equation (12), which is:

$$L_G = \sum_{(i,j) \in \Omega^+ \Omega^-} \Phi(P(i, j), A(i, j)) + \delta \|\Theta\|_F^2 \qquad (12)$$

where $L_G$ represents the loss value, $\Omega^+$ represents a set of positive sample serial numbers, each positive sample serial number represents a serial number of two text blocks that have an actual association, $\Omega^-$ represents a set of negative sample serial numbers, each negative sample serial number represents a serial number of two text blocks that do not have an actual association, $\Phi$ represents a calculation of mean square error, P(i, j) represents a normalized result obtained by normalizing a position encoding result for text block i and text block j through a normalized exponential function, A(i, j) represents a relation tag between the text block i and the text block j, $\delta$ represents a preset weight factor, $\Theta$ represents a preset parameter matrix, $$\|\cdot\|_F^2$$

represents a calculation of a square of F norm, where F is a preset value.

By using equation (12) to calculate the loss value, not only the mean square error between the position encoding result for each two text blocks and the relation tag, but also the preset parameter matrix may be combined to reduce the occurrence of under-fitting or over-fitting in the training of the entity recognition model, thereby improving the speed and efficiency of training the model.

In step S803, the entity recognition model is trained according to the loss value.

The network parameters in the entity recognition model may be adjusted using gradient descent with a goal of minimizing the loss value. The next training is performed until a preset convergence condition is met. Then, it is determined that the training of the entity recognition model is completed.

The preset convergence condition includes: the number of iterations during the training reaching a preset number, the loss value being less than a preset threshold, and/or a difference between a currently calculated loss value and a previous calculated loss value being less than a preset difference. Embodiments of the present disclosure do not limit to this.

The loss value is determined based on the position encoding result and the relation tag, and the entity recognition model is trained by using the loss value. In this way, the entity recognition model may aim to reduce the difference between the position encoding result and the relation tag, thereby learning whether a text block is a specified entity and whether an association exists between each two text blocks, which improves the recognition accuracy of the entity recognition model.

Figure 9:
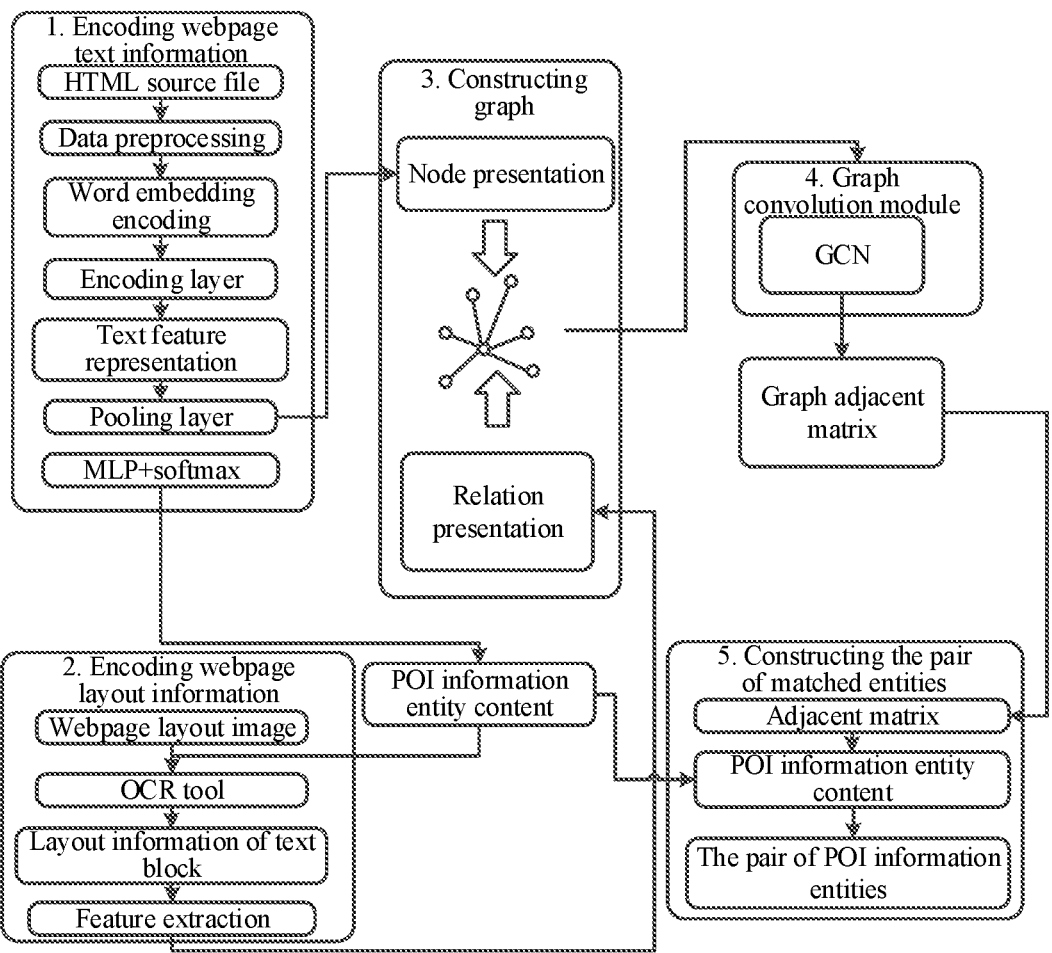
FIG. 9 shows an exemplary schematic diagram of a process of entity extraction and relation extraction provided by an embodiment of the present disclosure.

Referring to FIG. 9, the following illustrates a process of entity extraction and relation extraction on a webpage in combination with practical application scenarios.

The process of entity extraction and relation extraction for the webpage in embodiments of the present disclosure include five parts: 1. encoding webpage text information; 2. encoding webpage layout information; 3. constructing graph; 4. graph convolution module; and 5. constructing the pair of matched entities.

1. Encoding Webpage Text Information

A HTML source file of the webpage is acquired. Data preprocessing is performed on the source file, and the preprocessing includes tokenization, data cleaning and so on. Then, a word embedding encoding is performed on each element in the source file to obtain a path embedding vector, a position embedding vector, a token embedding vector, and a segment embedding vector for each element. The path embedding vector, the position embedding vector, the token embedding vector, and the segment embedding vector for each element are combined and input into an encoding layer which is a Transformer Encoder to obtain a text feature representation of each element output by the Transformer Encoder. And then, the text feature representation of each element is input into a pooling layer to obtain an encoding result for each element. The encoding result for each element may also be input into a MLP+softmax layer to obtain a specified entity recognized from the text content of each element, which is POI information entity content. The MLP+softmax layer is composed of a MLP layer followed by a softmax layer.

2. Encoding Webpage Layout Information

A webpage layout image is acquired, for example, the webpage layout image is a display frame of the webpage. According to the POI information entity content, an OCR tool is used to determine a text block formed by each recognized specified entity in the webpage. Display coordinates of each text block, a dimension of each text block, and a character length of each text block are acquired to obtain layout information of each text block. Then, a position encoding model is used to encode relative layout information between each two text blocks, that is, to extract features and obtain a position encoding result.

3. Constructing Graph

The encoding result for each specified entity recognized from the webpage may be used as a node presentation, and the position encoding result between each two text blocks may be used as a relation presentation of an edge, thereby constructing triples, and a graph is constructed using the triples. The constructed graph consists of 7 nodes and 6 edges in section "3. Constructing graph".

4. Graph Convolution Module

Each triple is input into a GCN to obtain a graph adjacent matrix output by the GCN.

5. Constructing the Pair of Matched Entities

A normalization is performed on the graph adjacent matrix. Each P(i, j) in the normalized adjacency matrix P represents a probability of an association between entity i and entity j. If P(i, j) is greater than 0.8, it is determined that an association exists between entity i and entity j. If P (i, j) is less than or equal to 0.8, it is determined that an association does not exist between entity i and entity j. Based on the POI information entity content, entities with an association may be used as the pair of matched POI information entities in the webpage.

In technical solutions of the present disclosure, a collection, a storage, a use, a processing, a transmission, a provision, a disclosure and other processing of webpage information involved comply with provisions of relevant laws and regulations and do not violate public order and good custom.

It should be noted that the webpage to be recognized and the sample webpage in embodiments of the present disclosure are both public webpages.

Figure 10:
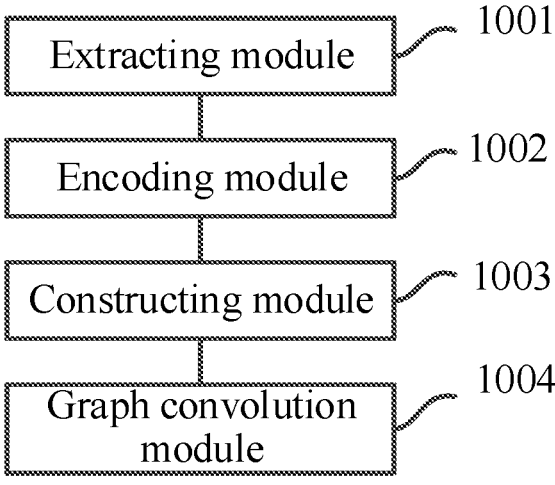
FIG. 10 shows a schematic structural diagram of an entity recognition apparatus provided by an embodiment of the present disclosure.

Based on the same concept, the present disclosure provides an entity recognition apparatus. As shown in FIG. 10, the apparatus includes an extracting module 1001, an encoding module 1002, a constructing module 1003, and a graph convolution module 1004.

The extracting module 1001 is used to extract a plurality of specified entities from a text included in a source file of a webpage to be recognized, and acquire a text encoding result for each specified entity.

The encoding module 1002 is used to determine a text block formed by each specified entity in the webpage to be recognized, and encode a relative layout information between each two text blocks, to obtain a position encoding result.

The constructing module 1003 is used to construct a triple by the position encoding result for each two text blocks and the text encoding results for respective specified entities of the two text blocks.

The graph convolution module 1004 is used to perform a graph convolution on each triple to obtain a relation recognition result for the webpage to be recognized, where the relation recognition result indicates whether an association exists between each two text blocks included in the webpage to be recognized.

For example, the extracting module 1001 is specifically used to:

perform a word embedding processing on a path of each element in the source file by using an entity extraction model in an entity recognition model, to obtain a path embedding vector for each element;

perform a word embedding processing by using the entity extraction model on a level of each element in the source file, an index of each element, and a position of each word of each element in a text content to which the word belongs, to obtain a position embedding vector for each element;

perform a word embedding processing on a word included in each element by using the entity extraction model, to obtain a token embedding vector for each element and a segment embedding vector for each element;

encode the path embedding vector, the position embedding vector, the token embedding vector, and the segment embedding vector for each element by using the entity extraction model, to obtain an encoding result for each element;

recognize the encoding result for each element by using the entity extraction model, to obtain a specified entity in a text content of each element; and determine that the text encoding result for each specified entity is the encoding result for the element to which the specified entity belongs.

For example, the extracting module 1001 is specifically used to: before performing the word embedding processing on the path of each element in the source file by using the entity extraction model in the entity recognition model to obtain the path embedding vector for each element, construct a document object model DOM tree based on the source file, where each node in the DOM tree corresponds to an element in the source file; and acquire a path expression of the node corresponding to each element in the DOM tree, as the path of the element in the source file.

For example, the relative layout information includes a relative position, and the encoding module 1002 is specifically used to: after determining the text block formed by each specified entity in the webpage to be recognized, acquire display coordinates of each text block, where the display coordinates are coordinates of a specified point within the text block in the webpage to be recognized;

determine the relative position between each two text blocks according to the display coordinates of the two text blocks; and encode the relative position between each two text blocks by using a position encoding model in an entity recognition model, to obtain the position encoding result.

For example, the relative layout information includes a relative position and a relative size, and the encoding module 1002 is specifically used to: after determining the text block formed by each specified entity in the webpage to be recognized, acquire display coordinates of each text block and a dimension of each text block, where the display coordinates are coordinates of a specified point within the text block in the webpage to be recognized;

determine the relative position between each two text blocks according to the display coordinates of the two text blocks;

determine the relative size between each two text blocks according to the dimensions of the two text blocks; and encode the relative position between each two text blocks and the relative size between each two text blocks by using a position encoding model in an entity recognition model, to obtain the position encoding result.

For example, the relative layout information includes a relative position, a relative size, a character length ratio, and a depth ratio, and the encoding module 1002 is specifically used to: after determining the text block formed by each specified entity in the webpage to be recognized, acquire display coordinates of each text block, a dimension of each text block, and a character length of each text block, where the display coordinates are coordinates of a specified point within the text block in the webpage to be recognized;

determine the relative position between each two text blocks according to the display coordinates of the two text blocks;

determine the relative size between each two text blocks according to the dimensions of the two text blocks;

calculate the character length ratio of each two text blocks according to the character lengths of the two text blocks;

calculate the depth ratio of each two text blocks according to path depths of elements in the source file, where specified entities of the two text blocks belong to the elements, respectively; and encode the relative position between each two text blocks, the relative size between each two text blocks, the character length ratio of each two text blocks, and the depth ratio of each two text blocks by using a position encoding model in an entity recognition model, to obtain the position encoding result.

Figure 11:
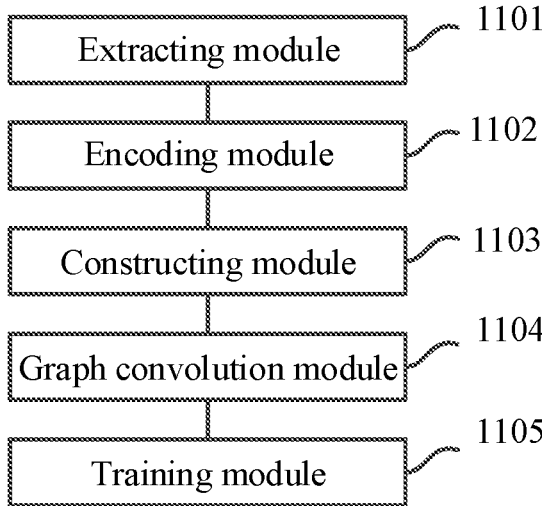
FIG. 11 shows a schematic structural diagram of a model training apparatus provided by an embodiment of the present disclosure.

Based on the same concept, the present disclosure provides a model training apparatus. As shown in FIG. 11, the apparatus includes an extracting module 1101, an encoding module 1102, a constructing module 1103, a graph convolution module 1104, and a training module 1105.

The extracting module 1101 is used to extract a plurality of specified entities from a source file of a sample webpage by using an entity extraction model in an entity recognition model, and determine a text encoding result for each specified entity.

The encoding module 1102 is used to determine a text block formed by each specified entity in the sample webpage, and encode a relative layout information between each two text blocks by using a position encoding model in the entity recognition model, to obtain a position encoding result.

The constructing module 1103 is used to construct a triple by the position encoding result for each two text blocks and the text encoding results for respective specified entities of the two text blocks.

The graph convolution module 1104 is used to perform a graph convolution on each triple by using a graph convolution model in the entity recognition model, to obtain a relation recognition result for the sample webpage, where the relation recognition result indicates whether an association exists between each two text blocks included in the sample webpage.

The training module 1105 is used to train the entity recognition model according to the position encoding result for each two text blocks and a relation tag, to obtain a trained entity recognition model, where the relation tag indicates whether an actual association exists between two text blocks.

For example, the extracting module 1101 is specifically used to:

perform a word embedding processing on a path of each element in the source file by using the entity extraction model, to obtain a path embedding vector for each element;

perform a word embedding processing by using the entity extraction model on a level of each element in the source file, an index of each element, and a position of each word of each element in a text content to which the word belongs, to obtain a position embedding vector for each element;

perform a word embedding processing on a word included in each element by using the entity extraction model, to obtain a token embedding vector for each element and a segment embedding vector for each element;

encode the path embedding vector, the position embedding vector, the token embedding vector, and the segment embedding vector for each element by using the entity extraction model, to obtain an encoding result for each element;

recognize the encoding result for each element by using the entity extraction model, to obtain a specified entity in a text content of each element; and determine that the text encoding result for each specified entity is the encoding result for the element to which the specified entity belongs.

For example, the extracting module 1101 is specifically used to: before performing the word embedding processing on the path of each element in the source file by using the entity extraction model, construct a document object model DOM tree based on the source file, where each node in the DOM tree corresponds to an element in the source file; and acquire a path expression of the node corresponding to each element in the DOM tree, as the path of the element in the source file.

For example, the relative layout information includes a relative position, and the encoding module 1102 is specifically used to: after determining the text block formed by each specified entity in the sample webpage, acquire display coordinates of each text block, where the display coordinates are coordinates of a specified point within the text block in the webpage to be recognized;

determine the relative position between each two text blocks according to the display coordinates of the two text blocks; and encode the relative position between each two text blocks by using the position encoding model, to obtain the position encoding result.

For example, the relative layout information includes a relative position and a relative size, and the encoding module 1102 is specifically used to: after determining the text block formed by each specified entity in the sample webpage, acquire display coordinates of each text block and a dimension of each text block, where the display coordinates are coordinates of a specified point within the text block in the webpage to be recognized;

determine the relative position between each two text blocks according to the display coordinates of the two text blocks;

determine the relative size between each two text blocks according to the dimensions of the two text blocks; and encode the relative position between each two text blocks and the relative size between each two text blocks by using the position encoding model, to obtain the position encoding result.

For example, the relative layout information includes a relative position, a relative size, a character length ratio, and a depth ratio, and the encoding module 1102 is specifically used to: after determining the text block formed by each specified entity in the sample webpage, acquire display coordinates of each text block, a dimension of each text block, and a character length of each text block, wherein the display coordinates are coordinates of a specified point within the text block in the webpage to be recognized;

determine the relative position between each two text blocks according to the display coordinates of the two text blocks;

determine the relative size between each two text blocks according to the dimensions of the two text blocks;

calculate the character length ratio of each two text blocks according to the character lengths of the two text blocks;

calculate the depth ratio of each two text blocks according to path depths of elements in the source file, where specified entities of the two text blocks belong to the elements, respectively; and encode the relative position between each two text blocks, the relative size between each two text blocks, the character length ratio of each two text blocks, and the depth ratio of each two text blocks by using the position encoding model, to obtain the position encoding result.

For example, the training module 1105 is specifically used to:

determine a mean square error between the position encoding result for each two text blocks and the relation tag;

determine a loss value based on each determined mean squared error; and train the entity recognition model according to the loss value.

For example, the loss value is:

$$L_G = \sum_{(i,j)\in\Omega^+\Omega^-} \Phi(P(i,j), A(i,j)) + \delta\|\Theta\|_F^2$$

where $L_G$ represents the loss value, $\Omega^+$ represents a set of positive sample serial numbers, each positive sample serial number represents a serial number of two text blocks that have an actual association, $\Omega^-$ represents a set of negative sample serial numbers, each negative sample serial number represents a serial number of two text blocks that do not have an actual association, $\Phi$ represents a calculation of mean square error, P(i, j) represents a normalized result obtained by normalizing a position encoding result for text block i and text block j through a normalized exponential function, A(i, j) represents a relation tag between the text block i and the text block j, $\delta$ represents a preset weight factor, $\Theta$ represents a preset parameter matrix, $$\|\cdot\|_F^2$$

represents a calculation of a square of F norm, where F is a preset value.

According to embodiments of the present disclosure, the present disclosure further provides an electronic device, a readable storage medium, and a computer program product.

Figure 12:
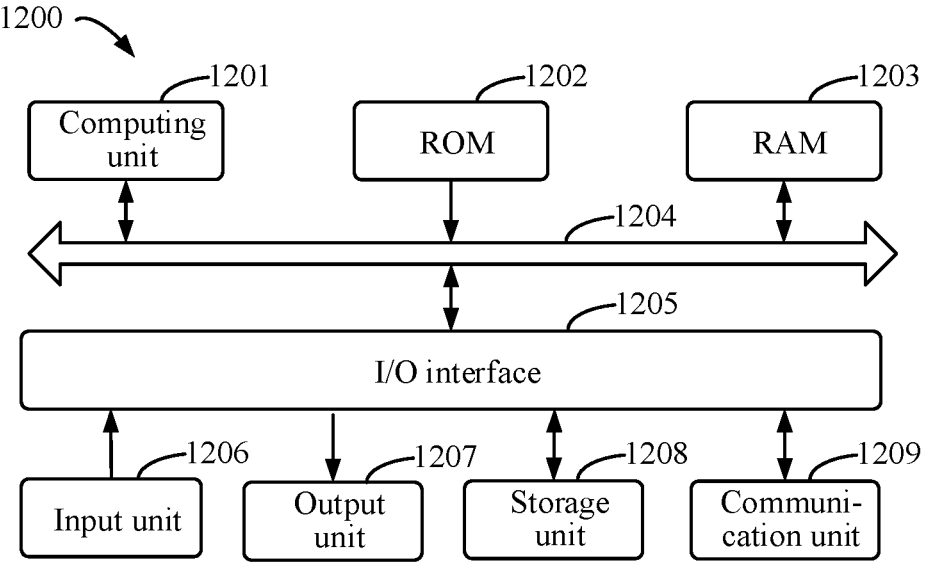
FIG. 12 shows a block diagram of an electronic device for implementing an entity recognition method or a model training method according to an embodiment of the present disclosure.

FIG. 12 shows a schematic block diagram of an example electronic device 1200 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relations, and functions thereof are merely examples, and are not intended to limit the implementation of the present disclosure described and/or required herein.

As shown in FIG. 12, the electronic device 1200 includes a computing unit 1201 which may perform various appropriate actions and processes according to a computer program stored in a read only memory (ROM) 1202 or a computer program loaded from a storage unit 1208 into a random access memory (RAM) 1203. In the RAM 1203, various programs and data necessary for an operation of the electronic device 1200 may also be stored. The computing unit 1201, the ROM 1202 and the RAM 1203 are connected to each other through a bus 1204. An input/output (I/O) interface 1205 is also connected to the bus 1204.

A plurality of components in the electronic device 1200 are connected to the I/O interface 1205, including: an input unit 1206, such as a keyboard, or a mouse; an output unit 1207, such as displays or speakers of various types; a storage unit 1208, such as a disk, or an optical disc; and a communication unit 1209, such as a network card, a modem, or a wireless communication transceiver. The communication unit 1209 allows the electronic device 1200 to exchange information/data with other devices through a computer network such as Internet and/or various telecommunication networks.

The computing unit 1201 may be various general-purpose and/or dedicated processing assemblies having processing and computing capabilities. Some examples of the computing units 1201 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1201 executes various methods and processes described above, such as the model training method or the entity recognition method. For example, in some embodiments, the model training method or the entity recognition method may be implemented as a computer software program which is tangibly embodied in a machine-readable medium, such as the storage unit 1208. In some embodiments, the computer program may be partially or entirely loaded and/or installed in the electronic device 1200 via the ROM 1202 and/or the communication unit 1209. The computer program, when loaded in the RAM 1203 and executed by the computing unit 1201, may execute one or more steps in the model training method or the entity recognition method described above. Alternatively, in other embodiments, the computing unit 1201 may be used to perform the model training method or the entity recognition method by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. A relation between the client and the server is generated through computer programs running on the corresponding computers and having a client-server relation with each other. The server may be a cloud server, a server of a distributed system, or a server combined with blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A model training method for an entity recognition model used in webpage information extraction, which extracts specified entities from a webpage and determines an association between the specified entities by training the entity recognition model, comprising:

acquiring a source file of a sample webpage and a display frame of the sample webpage;

constructing a document object model DOM tree based on the source file, wherein each node in the DOM tree corresponds to an element in the source file;

acquiring a path expression of the node corresponding to each element in the DOM tree, as the path of the element in the source file;

processing the path expression and text content of each element by using an entity extraction model in the entity recognition model to extract a plurality of specified entities from the source file of the sample webpage, and determining a text encoding result for each specified entity;

determining, based on the display frame of the sample webpage, a text block formed by each specified entity in the sample webpage using an optical character recognition (OCR) tool, and acquiring display coordinates of each text block, a dimension of each text block, and a character length of each text block, wherein the display coordinates are coordinates of a specified point within the text block in the sample webpage;

encoding, for each two text blocks, a relative layout information between each two text blocks by using a position encoding model in the entity recognition model based on the display coordinates, the dimensions, the character lengths of the two text blocks, and path depths of elements in the DOM tree, wherein specified entities of the two text blocks belong to the elements, respectively, to obtain a position encoding result;

constructing a triple by the position encoding result for each two text blocks and the text encoding results for respective specified entities of the two text blocks;

performing a graph convolution on each triple by using a graph convolution model in the entity recognition model, to obtain a relation recognition result for the sample webpage, wherein the relation recognition result indicates whether an association exists between each two text blocks comprised in the sample webpage; and training the entity recognition model according to the position encoding result for each two text blocks and a relation tag, to obtain a trained entity recognition model, wherein the trained entity recognition model is configured to extract structured entity relation pairs from the webpage, and the relation tag indicates whether an actual association exists between two text blocks, wherein the training the entity recognition model according to the position encoding result for each two text blocks and a relation tag comprises:

determining a mean square error between the position encoding result for each two text blocks and the relation tag;

determining a loss value based on each determined mean squared error; and training the entity recognition model according to the loss value, wherein the loss value is:

$$L_G = \sum_{(i,j) \in \Omega^+ \Omega^-} \Phi(P(i, j), A(i, j)) + \delta \|\Theta\|_F^2,$$

and wherein Le represents the loss value, $\Omega^+$ represents a set of positive sample serial numbers, each positive sample serial number represents a serial number of two text blocks that have an actual association, $\Omega^-$ represents a set of negative sample serial numbers, each negative sample serial number represents a serial number of two text blocks that do not have an actual association, $\phi$ represents a calculation of mean square error, P(i, j) represents a normalized result obtained by normalizing a position encoding result for text block i and text block/through a normalized exponential function, A(i, j) represents a relation tag between the text block i and the text block j, $\delta$ represents a preset weight factor, $\theta$ represents a preset parameter matrix, $$\| \cdot \|_F^2$$

represents a calculation of a square of F norm, where F is a preset value.

2. The method according to claim 1, wherein the extracting a plurality of specified entities from a source file of a sample webpage by using an entity extraction model in the entity recognition model and determining the text encoding result for each specified entity, comprises:

performing a word embedding processing on a path of each element in the source file by using the entity extraction model, to obtain a path embedding vector for each element;

performing a word embedding processing by using the entity extraction model on a level of each element in the source file, an index of each element, and a position of each word of each element in a text content to which the word belongs, to obtain a position embedding vector for each element;

performing a word embedding processing on a word comprised in each element by using the entity extraction model, to obtain a token embedding vector for each element and a segment embedding vector for each element;

encoding the path embedding vector, the position embedding vector, the token embedding vector, and the segment embedding vector for each element by using the entity extraction model, to obtain an encoding result for each element;

recognizing the encoding result for each element by using the entity extraction model, to obtain a specified entity in a text content of each element; and determining that the text encoding result for each specified entity is the encoding result for the element to which the specified entity belongs.

3. The method according to claim 1, wherein the relative layout information comprises a relative position, and the encoding a relative layout information between each two text blocks by using a position encoding model in the entity recognition model, comprises:

determining the relative position between each two text blocks according to the display coordinates of the two text blocks; and encoding the relative position between each two text blocks by using the position encoding model, to obtain the position encoding result.

4. The method according to claim 1, wherein the relative layout information comprises a relative position and a relative size, and the encoding a relative layout information between each two text blocks by using a position encoding model in the entity recognition model, comprises:

determining the relative position between each two text blocks according to the display coordinates of the two text blocks;

determining the relative size between each two text blocks according to the dimensions of the two text blocks; and encoding the relative position between each two text blocks and the relative size between each two text blocks by using the position encoding model, to obtain the position encoding result.

5. The method according to claim 2, wherein the relative layout information comprises a relative position, a relative size, a character length ratio, and a depth ratio, and the encoding a relative layout information between each two text blocks by using a position encoding model in the entity recognition model, comprises:

determining the relative position between each two text blocks according to the display coordinates of the two text blocks;

determining the relative size between each two text blocks according to the dimensions of the two text blocks;

calculating the character length ratio of each two text blocks according to the character lengths of the two text blocks;

calculating the depth ratio of each two text blocks according to path depths of elements in the source file, wherein specified entities of the two text blocks belong to the elements, respectively; and encoding the relative position between each two text blocks, the relative size between each two text blocks, the character length ratio of each two text blocks, and the depth ratio of each two text blocks by using the position encoding model, to obtain the position encoding result.

6. An electronic device, comprising:

at least one processor; and a memory communicatively connected to the at least one processor, wherein the memory stores instructions executable by the at least one processor, and the instructions, when executed by the at least one processor, are configured to cause the at least one processor to implement the method of claim 1.

7. A non-transitory computer-readable storage medium having computer instructions therein, wherein the computer instructions are configured to cause a computer to implement the method of claim 1.

8. An entity recognition method, executed by an entity recognition model trained using the method according to claim 7, comprising:

extracting a plurality of specified entities from a text comprised in a source file of a webpage to be recognized, and acquiring a text encoding result for each specified entity;

determining a text block formed by each specified entity in the webpage to be recognized, and encoding a relative layout information between each two text blocks, to obtain a position encoding result;

constructing a triple by the position encoding result for each two text blocks and the text encoding results for respective specified entities of the two text blocks; and performing a graph convolution on each triple to obtain a relation recognition result for the webpage to be recognized, wherein the relation recognition result indicates whether an association exists between each two text blocks comprised in the webpage to be recognized.

9. The method according to claim 8, wherein the extracting a plurality of specified entities from a text comprised in a source file of a webpage to be recognized and acquiring the text encoding result for each specified entity, comprises:

performing a word embedding processing on a path of each element in the source file by using an entity extraction model in the entity recognition model, to obtain a path embedding vector for each element;

performing a word embedding processing by using the entity extraction model on a level of each element in the source file, an index of each element, and a position of each word of each element in a text content to which the word belongs, to obtain a position embedding vector for each element;

performing a word embedding processing on a word comprised in each element by using the entity extraction model, to obtain a token embedding vector for each element and a segment embedding vector for each element;

encoding the path embedding vector, the position embedding vector, the token embedding vector, and the segment embedding vector for each element by using the entity extraction model, to obtain an encoding result for each element;

recognizing the encoding result for each element by using the entity extraction model, to obtain a specified entity in a text content of each element; and determining that the text encoding result for each specified entity is the encoding result for the element to which the specified entity belongs.

10. The method according to claim 8, wherein the relative layout information comprises a relative position, and the encoding a relative layout information between each two text blocks to obtain a position encoding result, comprises:

determining the relative position between each two text blocks according to the display coordinates of the two text blocks; and encoding the relative position between each two text blocks by using a position encoding model in an entity recognition model, to obtain the position encoding result.

11. The method according to claim 8, wherein the relative layout information comprises a relative position and a relative size, and the encoding a relative layout information between each two text blocks to obtain a position encoding result, comprises:

determining the relative position between each two text blocks according to the display coordinates of the two text blocks;

determining the relative size between each two text blocks according to the dimensions of the two text blocks; and encoding the relative position between each two text blocks and the relative size between each two text blocks by using a position encoding model in an entity recognition model, to obtain the position encoding result.

12. The method according to claim 9, wherein the relative layout information comprises a relative position, a relative size, a character length ratio, and a depth ratio, and the encoding a relative layout information between each two text blocks to obtain a position encoding result, comprises:

determining the relative position between each two text blocks according to the display coordinates of the two text blocks;

determining the relative size between each two text blocks according to the dimensions of the two text blocks;

calculating the character length ratio of each two text blocks according to the character lengths of the two text blocks;

calculating the depth ratio of each two text blocks according to path depths of elements in the source file, wherein specified entities of the two text blocks belong to the elements, respectively; and encoding the relative position between each two text blocks, the relative size between each two text blocks, the character length ratio of each two text blocks, and the depth ratio of each two text blocks by using a position encoding model in an entity recognition model, to obtain the position encoding result.

13. An electronic device, comprising:

at least one processor; and a memory communicatively connected to the at least one processor, wherein the memory stores instructions executable by the at least one processor, and the instructions, when executed by the at least one processor, are configured to cause the at least one processor to implement the method of claim 8.

14. The electronic device according to claim 13, wherein the instructions are further configured to cause the at least one processor to at least:

perform a word embedding processing on a path of each element in the source file by using an entity extraction model in the entity recognition model, to obtain a path embedding vector for each element;

perform a word embedding processing by using the entity extraction model on a level of each element in the source file, an index of each element, and a position of each word of each element in a text content to which the word belongs, to obtain a position embedding vector for each element;

perform a word embedding processing on a word comprised in each element by using the entity extraction model, to obtain a token embedding vector for each element and a segment embedding vector for each element;

encode the path embedding vector, the position embedding vector, the token embedding vector, and the segment embedding vector for each element by using the entity extraction model, to obtain an encoding result for each element;

recognize the encoding result for each element by using the entity extraction model, to obtain a specified entity in a text content of each element; and determine that the text encoding result for each specified entity is the encoding result for the element to which the specified entity belongs.

15. A non-transitory computer-readable storage medium having computer instructions therein, wherein the computer instructions are configured to cause a computer to implement the method of claim 8.

* * * * *